(12) United States Patent
Liethen (10) Patent No.: US 7,789,040 B2
(45) Date of Patent: Sep. 7, 2010

(54) JELLY/JAM BIRD FEEDER

(75) Inventor: Frederic J. Liethen, Appleton, WI (US)

(73) Assignee: Gold Crest Distributing, LLC, Mexico, MO (US)

( * ) Notice: Subject to any disclaimer, the term of this patent is extended or adjusted under 35 U.S.C. 154(b) by 432 days.

(21) Appl. No.: 11/954,494

(22) Filed: Dec. 12, 2007

(65) Prior Publication Data

US 2008/0141944 A1  Jun. 19, 2008

Related U.S. Application Data

(60) Provisional application No. 60/869,756, filed on Dec. 13, 2006.

(51) Int. Cl.
*A01K 39/00* (2006.01)
(52) U.S. Cl. .................. 119/57.8; 119/72; D30/124
(58) Field of Classification Search .............. 119/57.8, 119/72, 537; 222/78; D30/124, 125; 220/376, 220/475, 743, 776
See application file for complete search history.

(56) References Cited

U.S. PATENT DOCUMENTS

| 2,475,207 | A | * | 7/1949 | Smith | 119/52.2 |
|---|---|---|---|---|---|
| 2,570,733 | A | * | 10/1951 | Thomas | 119/72 |
| 3,040,705 | A | * | 6/1962 | Schlitz | 119/51.01 |
| 3,049,093 | A | * | 8/1962 | Oliver | 119/57.9 |
| 3,125,069 | A | * | 3/1964 | Fowler | 119/77 |
| 3,191,579 | A | * | 6/1965 | Oliver | 119/57.8 |
| 3,960,112 | A | * | 6/1976 | Tiller | 119/57.8 |
| 5,450,816 | A | * | 9/1995 | Santa Cruz | 119/72 |
| 5,507,249 | A | * | 4/1996 | Shaw | 119/72 |
| 5,682,835 | A | * | 11/1997 | Walter et al. | 119/57.8 |
| 6,792,891 | B1 | * | 9/2004 | Coburn et al. | 119/72 |
| 7,093,562 | B2 | * | 8/2006 | Smothers | 119/72 |
| 7,634,974 | B1 | * | 12/2009 | Puckett et al. | 119/74 |
| 7,685,969 | B2 | * | 3/2010 | Stone et al. | 119/72 |
| 2004/0103851 | A1 | * | 6/2004 | Hunter | 119/72 |
| 2008/0257273 | A1 | * | 10/2008 | Carter et al. | 119/72 |

* cited by examiner

*Primary Examiner*—Kimberly S Smith
*Assistant Examiner*—Danielle Clerkley
(74) *Attorney, Agent, or Firm*—Martin & Associates, LLC; Derek P. Martin (57) ABSTRACT

A bird feeder includes a cradle for attachment to a jar of jelly or jam, and one or more perches that are disposed near the opening of the jar when the cradle is attached to the jar so a bird may light on a perch and feed from the jar. The bird feeder may include a flower portion with a circular opening for attracting birds, and may also include one or more connector loops for hanging the bird feeder with the attached jar. The perches may be straight, curved, U-shaped or any other suitable configuration.

11 Claims, 9 Drawing Sheets

JELLY/JAM BIRD FEEDER

CROSS-REFERENCE TO RELATED APPLICATION

This patent application claims priority on provisional patent application 60/869,756 entitled Jelly/Jam Bird Feeder filed on Dec. 13, 2006, which is incorporated herein by reference.

BACKGROUND

1. Technical Field

This disclosure pertains generally to bird feeders, and more specifically relates to bird feeders for feeding jelly or jam to birds.

2. Background Art

Many different types and styles of bird feeders have been developed over the years. Dry feeders typically allow birds to eat seeds such as millet, sunflower seeds, etc. or any suitable mixture of dry seeds. Liquid feeders are also known for providing sweetened liquid such as sugar-water syrup to hummingbirds. Most people who use a hummingbird feeder make the syrup themselves. Keeping a hummingbird feeder supplied with syrup creates some work for the owner of the feeder. In addition, the process of refilling the hummingbird feeder with syrup can be time-consuming and messy.

BRIEF SUMMARY

The disclosure and claims herein are directed to a feeder that provides an alternate, attractive way to attract nectar loving birds to a no mess, fruit jelly or jam feeder. A colored flower is provided to attract birds. A perch is provided near the flower. A cradle may be part of the flower or may be attached to the flower, and is used to support a jelly or jam container. The various pieces mentioned above may be fastened together by various means. In addition, the various pieces may be molded together in a single unibody plastic molding.

Standard jelly or jam may be purchased in containers, off the shelf at any grocery store and attached to the feeder using various rigging and fastening mechanisms. Jars that are 10 to 12 oz. glass containers are recommended. However, plastic and other containers of various materials will also work. As used herein, the term "jar" is used broadly to mean any suitable receptacle for jelly or jam, whether currently known or developed in the future and regardless of whether jelly or jam is sold in such a receptacle or not. The use of standard off the shelf jelly or jam jars make this feeder easy to use because there is no spooning of jelly or jam from one container to another (no mess feeding). Through development, it has been evident that Smucker's is the most readily available brand of jelly/jam. Jars work best fastening to the feeder cradle.

The cradle holding the feeder reservoir is unique in that it has various built in mounting means to its holder. The cradle also has expansion loops integrated to expand to fit the large diameter jar or container. The mounting means and hanger maintain the feed container at approximately a 30° angle, so as to prevent the jelly or jam from running out the feed opening. Maintaining the approximately 30° angle may be accomplished either manually or semi-manually through a weight and balance means. An alternative cradle or holder and perch mount may be constructed or rigged from various other materials and means using wire, knots, slip fasteners, string or other fastening materials.

BRIEF DESCRIPTION OF THE SEVERAL VIEWS OF THE DRAWING(S)

The disclosure will be described in conjunction with the appended drawings, where like designations denote like elements, and.

DETAILED DESCRIPTION

Figure 1:
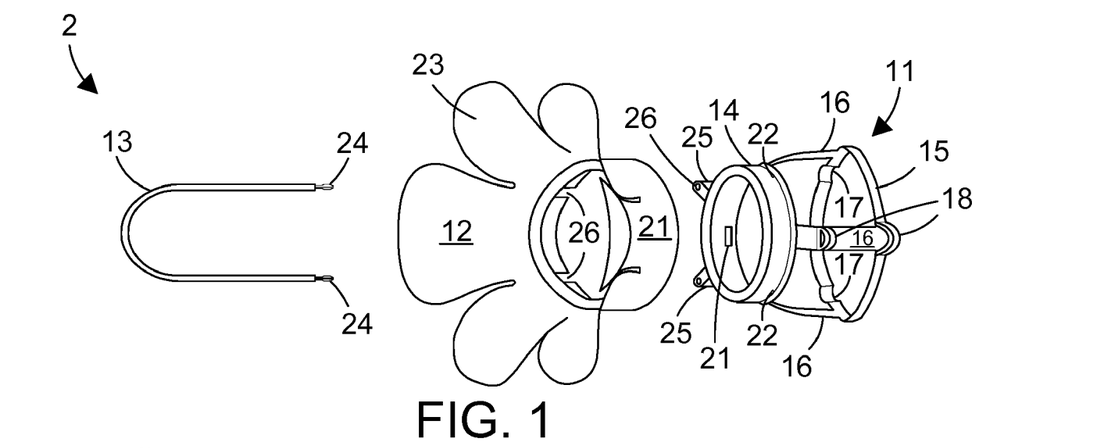
FIG. 1 is a top exploded view of a jelly/jam feeder.
Figure 2:
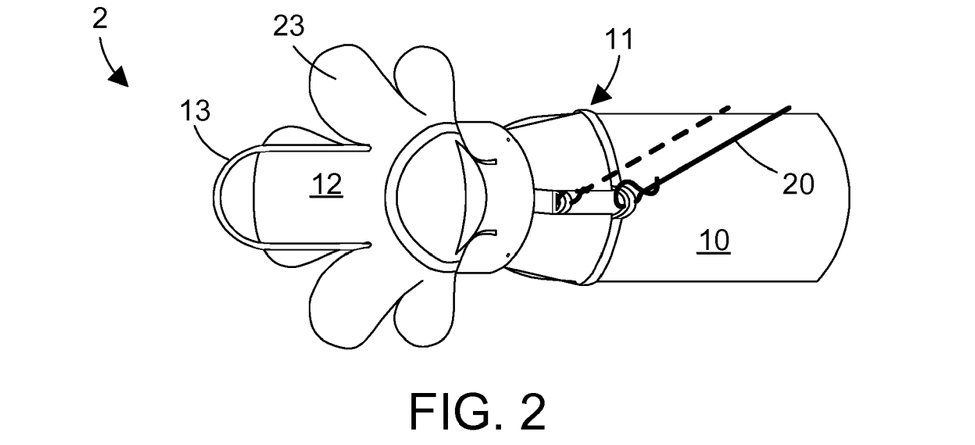
FIG. 2 is a top view of the jelly/jam feeder when assembled together and attached to a jar of jelly or jam.
Figure 3:
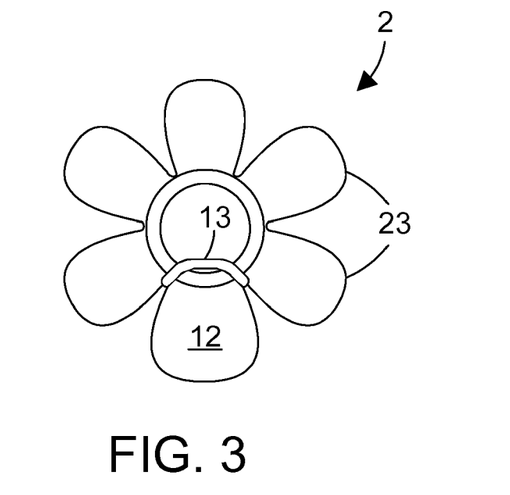
FIG. 3 is a front view of the jelly/jam feeder shown in FIGS. 1 and 2.

FIGS. 1-3 show different views of one specific configuration for a jelly/jam feeder 2 within the scope of the disclosure and claims herein. The jelly/jam feeder 2 may be attached to a conventional jelly or jam jar 10 by way of a cradle 11 to which is separately attached an attracting flower 12 and a perch 13. One or more of the parts 11-13 may be integrally molded, but as shown, it is presently preferred to mold the cradle 11, flower 12 and perch 13 separately.

The cradle 11 includes a circular receptacle 14 which surrounds and receives the neck of the jar 10. The receptacle 14 is provided on its interior surface with one or more internal retaining members that are configured to engage and hold the neck on a jelly or jam jar. One implementation of internal retaining members is one or more protrusions configured to engage external protrusions (such as screw threads or lugs) on the neck of a glass jelly or jam jar that are normally used to secure a lid on the jar. One sample of such an internal retaining member is shown as a rectangular protrusion 21 in FIG. 1. With internal retaining members that engage the external threads or lugs on a neck of a jelly or jam jar, the jar may be secured to the circular receptacle by removing the lid on the jar, then replacing the lid with the circular receptacle, which is attached by turning the cradle until the internal retaining members engage the threads or lugs on the neck of the jar until a tight fit is achieved. Another sample of a suitable internal retaining member is one or more deformable tabs that may be pressed onto the threads, lugs or neck of a jam or jelly jar in a snap-fit fashion, allowing the cradle to be mechanically coupled to a jelly or jam jar in a secure yet removable fashion.

The cradle 11 also includes a circular band 15 which surrounds the body of the jar after the neck is inserted into the receptacle 14 to secure the jar 10 to the cradle 11. The band 15 and receptacle 14 are connected by a plurality of axially extending ribs 16. The number of ribs shown in FIG. 1 is three, but any suitable number of ribs could be used. The band 15 may include one or more offset portions 17 to allow the band to expand to accept a slightly larger diameter jar body. The offset portions 17 are deformable portions that allow the circular band 15 to stretch to a diameter greater than a normal diameter of the circular band 15 when not stretched. One of the ribs 16 is provided with a pair of axially spaced connector loops 18 to which a wire hanger 20 may be conveniently attached to suspend the cradle jar from a tree branch, feeder station or the like. Because the jar is preferably suspended at about a 30° angle, as the contents of the jar are consumed, the wire hanger may be moved from the forward most loop to the rearward loop or loops.

The flower 12 has a circular rim 21 with an inside diameter sized to allow it to be slid over the outside diameter of the circular receptacle 14 on the cradle 11. The inside diameter of the circular rim 21 and the outside diameter of the receptacle 14 are preferably provided with interlocking holes and tabs to permit the flower to be snap fit onto the cradle receptacle. In FIG. 1, the outside diameter of the receptacle 14 is provided with small holes 22 which are engaged by corresponding tabs (not shown) on the inside diameter of flower rim 21. Petals 23 are preferably formed integrally with the circular rim 21.

The perch 13 preferably includes a semicircular portion and two free ends, and is attached by its free ends 24 to sockets 25 molded into the receptacle portion 14 of the cradle 11. Each socket 25 includes a hole 26 that receives a free end 24 of perch 13. Free ends 24 preferably include an attachment mechanism that allows the free ends 24 to snap into the holes 26 on sockets 25 and be retained in the sockets 25. The circular rim 21 of the flower 12 is provided with suitable notches 26 to accommodate the sockets 25 when the flower 12 is attached to the cradle 11. The sockets 25 are positioned such that the perch 13 straddles the lowermost petal of the flower 12 when the apparatus is suspended on the wire hanger 20. However, the perch could be made to attach anywhere adjacent one of the petals since it is known that perching birds will feed in many orientations, including upside down.

Figure 4:
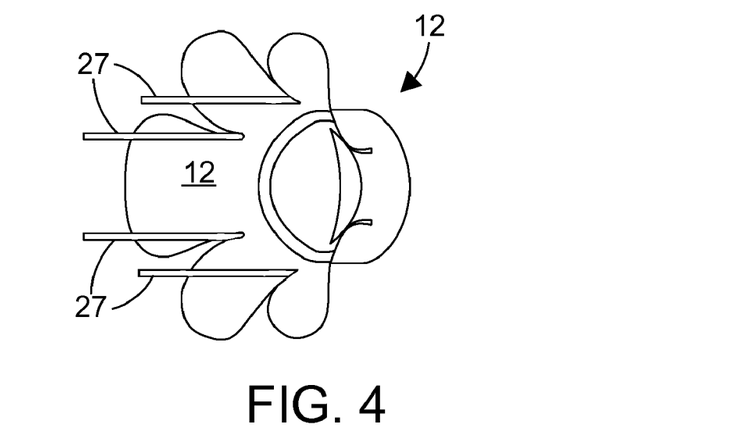
FIG. 4 is an alternative configuration for the flower shown in FIG. 1 showing the use of multiple straight perches.

In an alternative configuration for the flower 12 shown in FIG. 4, multiple straight stick-like perches 27 are inserted either through holes in the flower 12 or between the flower petals 23 and into corresponding sockets in the cradle 11. Note the perches 27, while shown straight in FIG. 4, could be curved or any other suitable shape.

Figure 5:
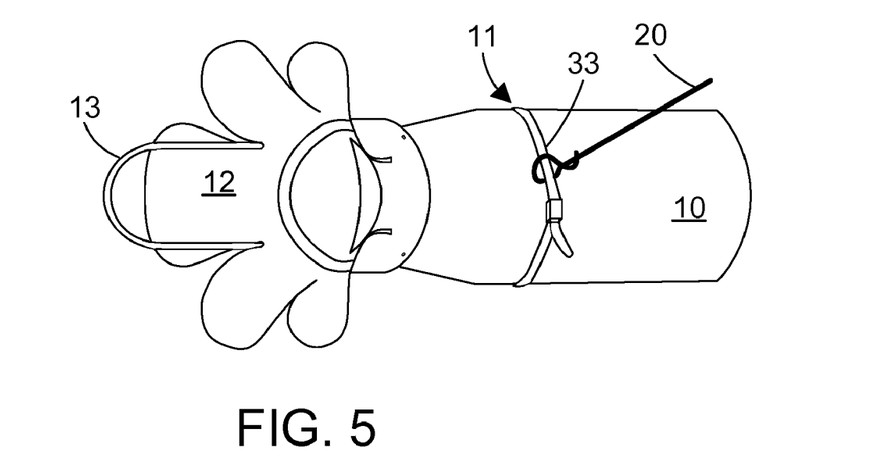
FIG. 5 shown an alternative configuration for the jelly/jam feeder using an adjustable strap instead of a cradle.

In FIG. 5, there is shown a modified construction in which the flower 12 and the cradle 11 are completely separate. In this configuration, the flower 12 has a circular rim with internal retaining members that allow attaching the flower 12 to a neck of the jar 10. The outer surface of the rim may be provided with sockets similar to the sockets 25 in the cradle shown in FIGS. 1-3. A perch 13 may be attached to sockets on the flower 12 in a manner similar to how the perch 13 in FIGS. 1-3 is attached to the sockets 25 on cradle 11.

Figure 6:
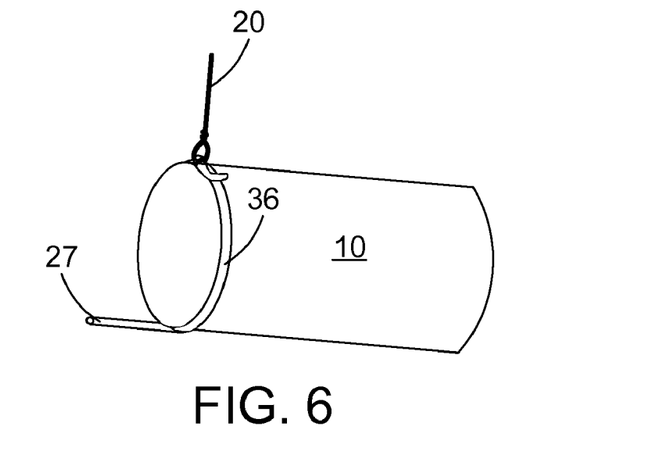
FIG. 6 shows an alternative configuration for the jelly/jam feeder using an adjustable strap directly on a jam or jelly jar with a straight perch.

The cradle 11 in FIG. 5 is a simple adjustable strap 33 that is tightened around the body of the jar and to which a wire hanger 20 or the like is attached. The adjustable strap 33 can be moved axially along the jar body as the contents are consumed to maintain the jar at the preferred 30° angle. FIG. 6 shows a simple configuration in which the jar 10 is cradled with an adjustable strap 36 attached around the neck of the jar. The adjustable strap may be of any convenient construction including plastic, wire or the like. A wire tie is especially suitable for this configuration. A simple straight perch 27 may be held in position by the adjustable strap 36 or may be molded integrally therewith. A wire hanger 20 is held by the strap 20 in a manner similar to the previously described embodiment of FIG. 5.

Figure 7:
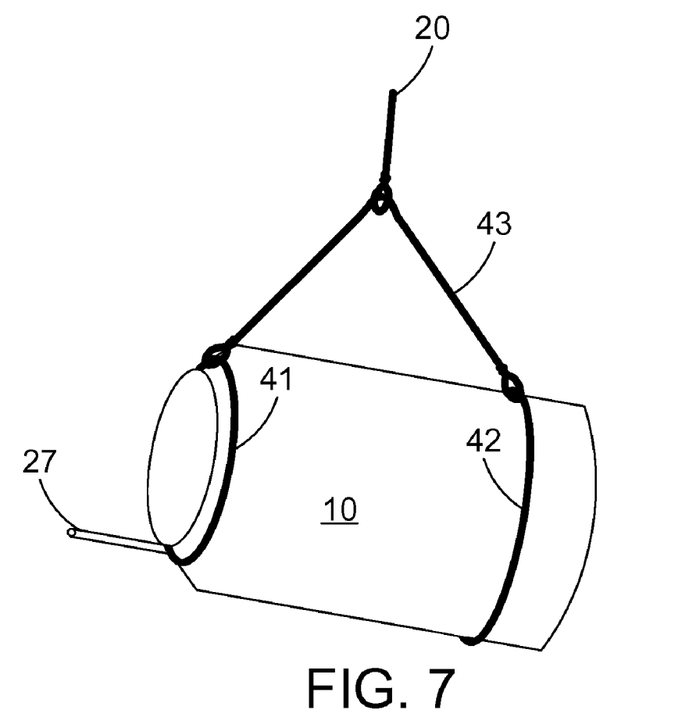
FIG. 7 shows an alternative configuration for the jelly/jam feeder using adjustable straps.
Figure 8:
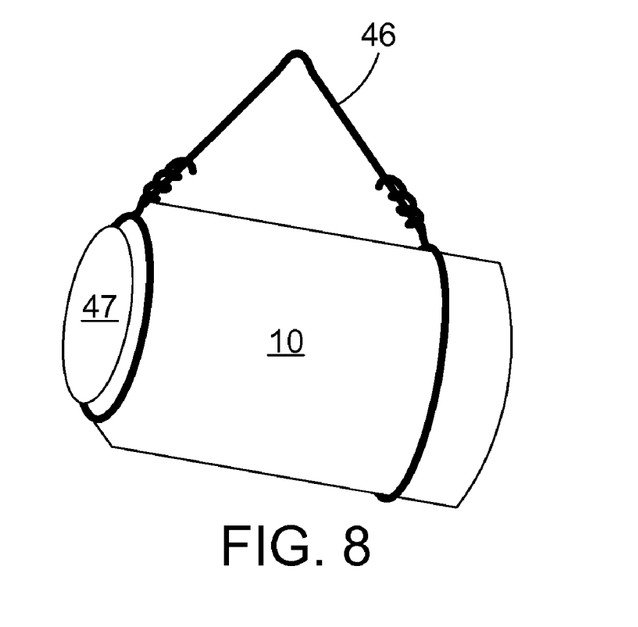
FIG. 8 shows an alternative configuration for the jelly/jam feeder showing a single piece strap tied to hold the jar.

In a modified version of the configuration shown in FIG. 6, FIG. 7 shows a jar with front and rear adjustable straps 41 and 42, respectively, to which is attached a loop 43. Loop 43 may be connected to a wire hanger 20 or the like to suspend the jar. A perch 27 may be captured and held by the forward adjustable strap 41, or may be fabricated integral to the adjustable strap 41. In FIG. 8, a single adjustment strap 46, of plastic, wire or the like, encircles and is tied by one end to the neck of the jar 47 and by the opposite end to the body of the jar.

Figures 9, 10, 11:
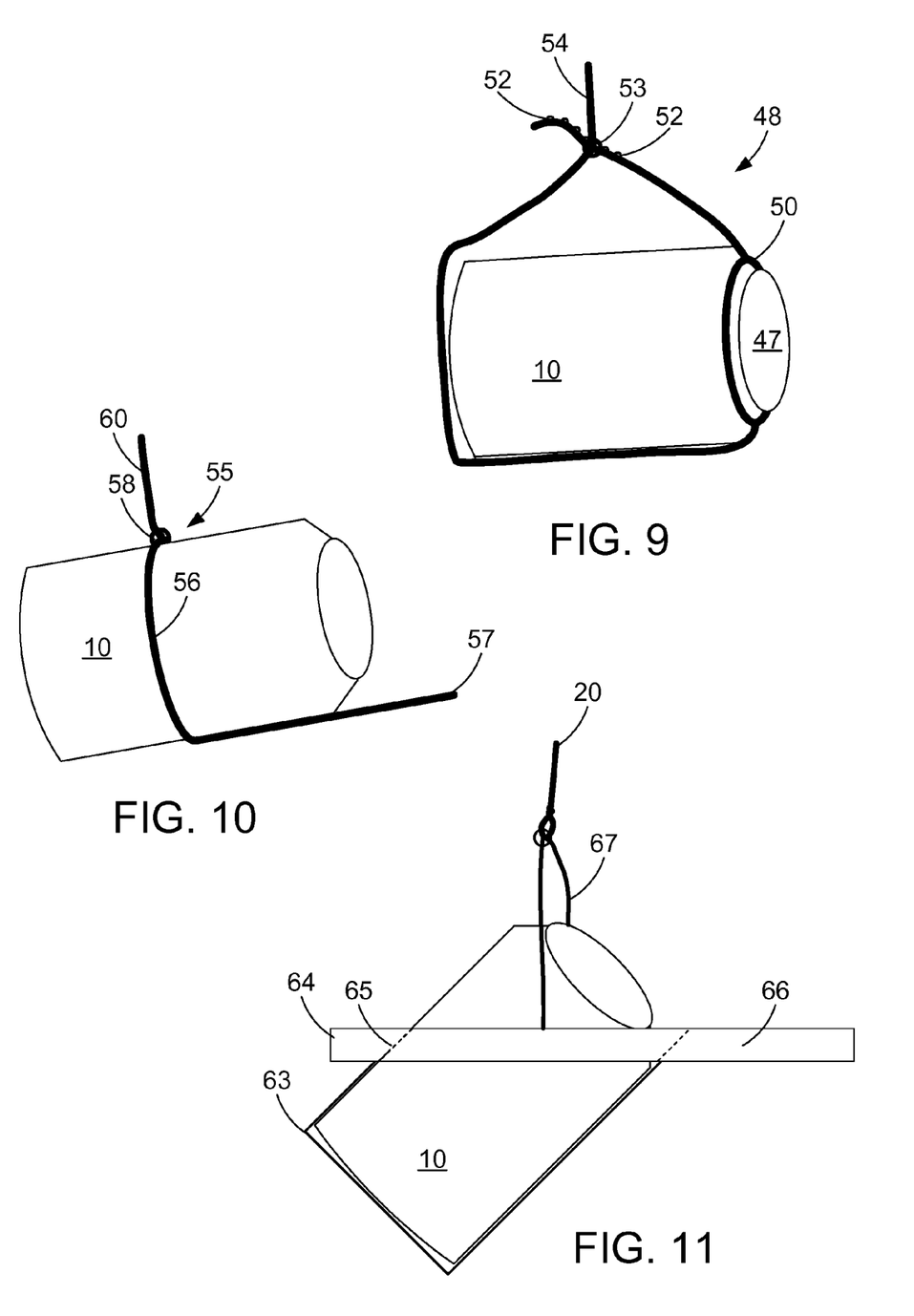
FIG. 9 shows an alternative configuration for the jelly/jam feeder showing a one-piece molded cradle and hanger.
FIG. 10 shows an alternative configuration for the jelly/jam feeder showing a different one-piece molded cradle and hanger.
FIG. 11 shows an alternative configuration s for the jelly/jam feeder showing a board perch and holder for the jar.

In FIG. 9, a one-piece molded cradle and hanger 48 includes a receptacle 50 for the neck 47 of the jar 10, one free end provided with a series of adjustment protrusions 52 which can be pulled through a loop 53 on the other end of the hanger. The loop 53 may be provided with an integral or a separate hanger piece 54. By variably adjusting the protrusions 52 engaged by the loop 53, the jar can be adjusted to be held in many variable positions.

In FIG. 10, a one piece molded cradle/hanger 55 is shown which is similar to the configuration shown in FIG. 9. An adjustable strap 56 includes an integrally molded perch 57, a connecting loop 58 on one end, through which the opposite free end 60 is threaded after being wrapped around the body of the jar 10.

Another suitable configuration is shown in FIG. 11. The jar 10 is supported in a basket 63 attached to the underside of a flat board 64 (which could be metal, wood or plastic) with the jar inserted through an angled hole 65 in the board 64, the hole oriented at the preferred 30° angle for mounting the jar. The board extends away from the mouth of the jar to provide a convenient perch 66. A hanger strap 67 is attached to the board 64 on opposite sides of the jar for hanging with a convenient wire hanger 20 or the like.

Figures 12, 13, 14:
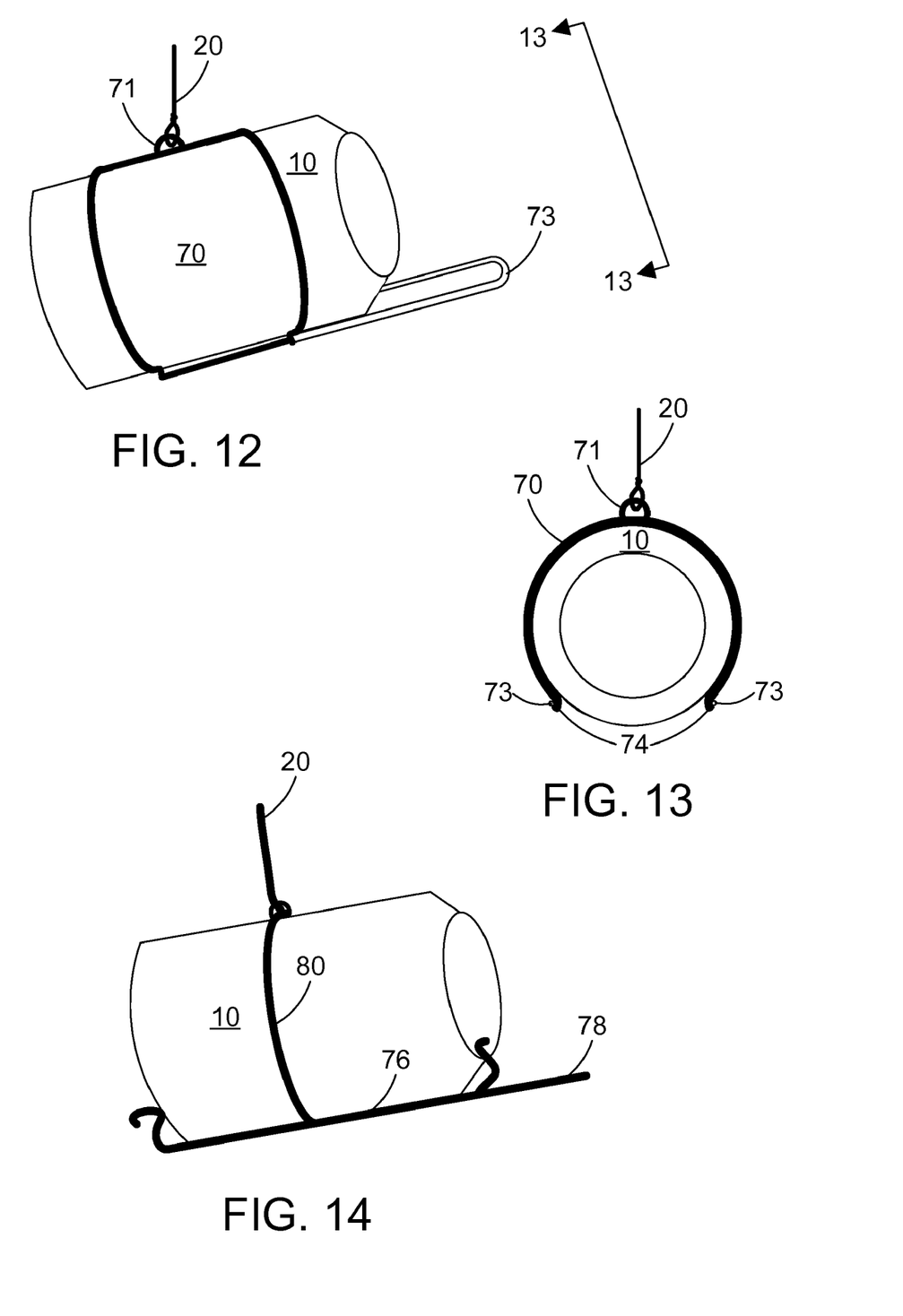
FIG. 12 shows an alternative configuration for the jelly/jam feeder showing a cylindrical clip that holds the jar.
FIG. 13 is an end view of the configuration shown in FIG. 12 taken along the line 13-13.
FIG. 14 shows an alternative configuration for the jelly/jam feeder having clips to hold the jar in place.

In FIGS. 12 and 13, a flexible cylindrical clip 70, is snapped over the body of the jar to provide a cradle. An integral eye 71 provides for attachment of a wire hanger 20 and a U-shaped perch 73 can be attached to the clip 70 (e.g., at bent edges 74) or may be molded integrally therewith. The clip 70 may be moved axially along the body of the jar 10 to vary the tilt angle. In addition, clip 70 may surround the jar 10 so such an extent that snapping the clip 70 onto the jar 10 may be difficult or impossible. With such a configuration, the clip 70 may be slid over the end of the jar 10 to its desired location on the jar 10. In addition, the clip 70 may include sockets for receiving one or more perches, or may have one or more perches formed integral with the clip 70.

In FIG. 14, a modified clip 76 snap attaches to the open mouth and the recessed rear end of the jar 10. A perch 78 may be integrally molded with the clip or attached separately. A strap 80 surrounds and cradles the jar 10. The strap may be integral with the clip or separate therefrom. The upper ends of the strap 80 are attached to a conventional wire hanger 20.

Figure 15:
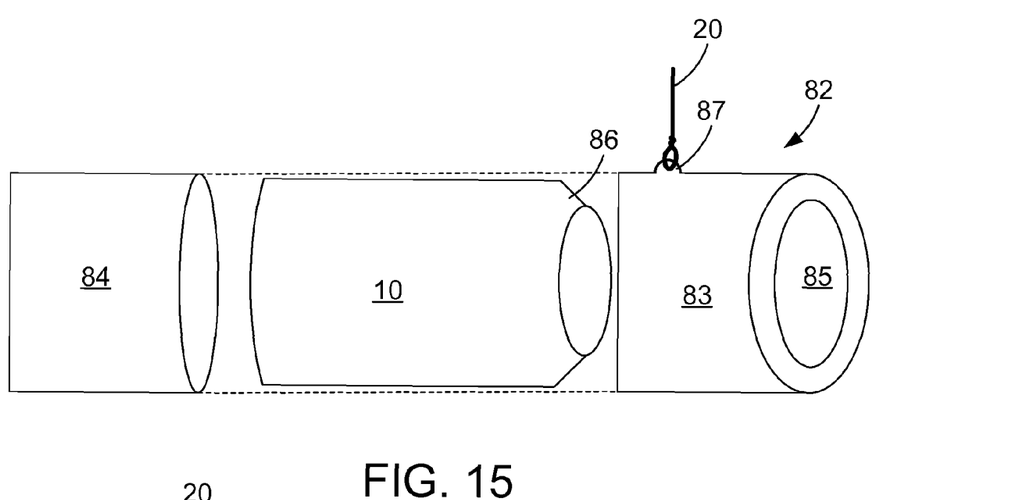
FIG. 15 shows an alternative configuration for the jelly/jam feeder having front and rear sleeves that slide over and hold the jar.

FIG. 15 shows a two piece cradle 82 comprising a front sleeve 83 and a rear sleeve 84. The sleeves are slid over the opposite ends of the jar 10 with the neck 86 of the jar protruding through a hole 85 in the front sleeve 83. The opposed edges of the sleeves are provided with suitable snap attachment means such as holes and tabs (not shown). The front sleeve 83 has an integral connector loop 87 to which standard wire hanger 20 may be attached.

Figure 16:
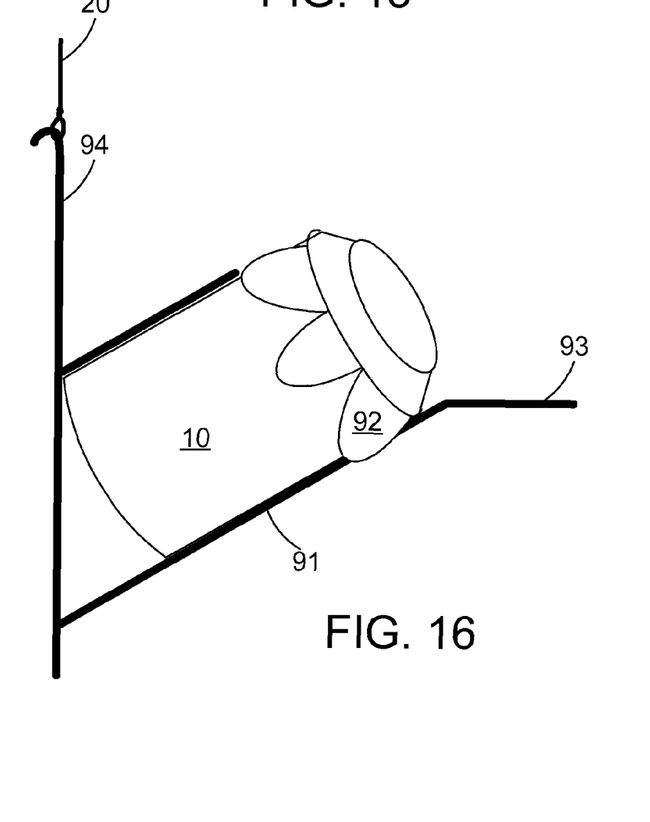
FIG. 16 shows an alternative configuration for the jelly/jam feeder showing an inclined cradle and perch.

In FIG. 16, the jar 10 is held in a cylindrical cradle 91 which may be provided with an integral flower 92 and/or perch 93. An upstanding hanger attachment 94 is preferably formed integrally with the cradle 91 and bent for attachment to a conventional wire hanger 20.

Figures 17, 18, 19:
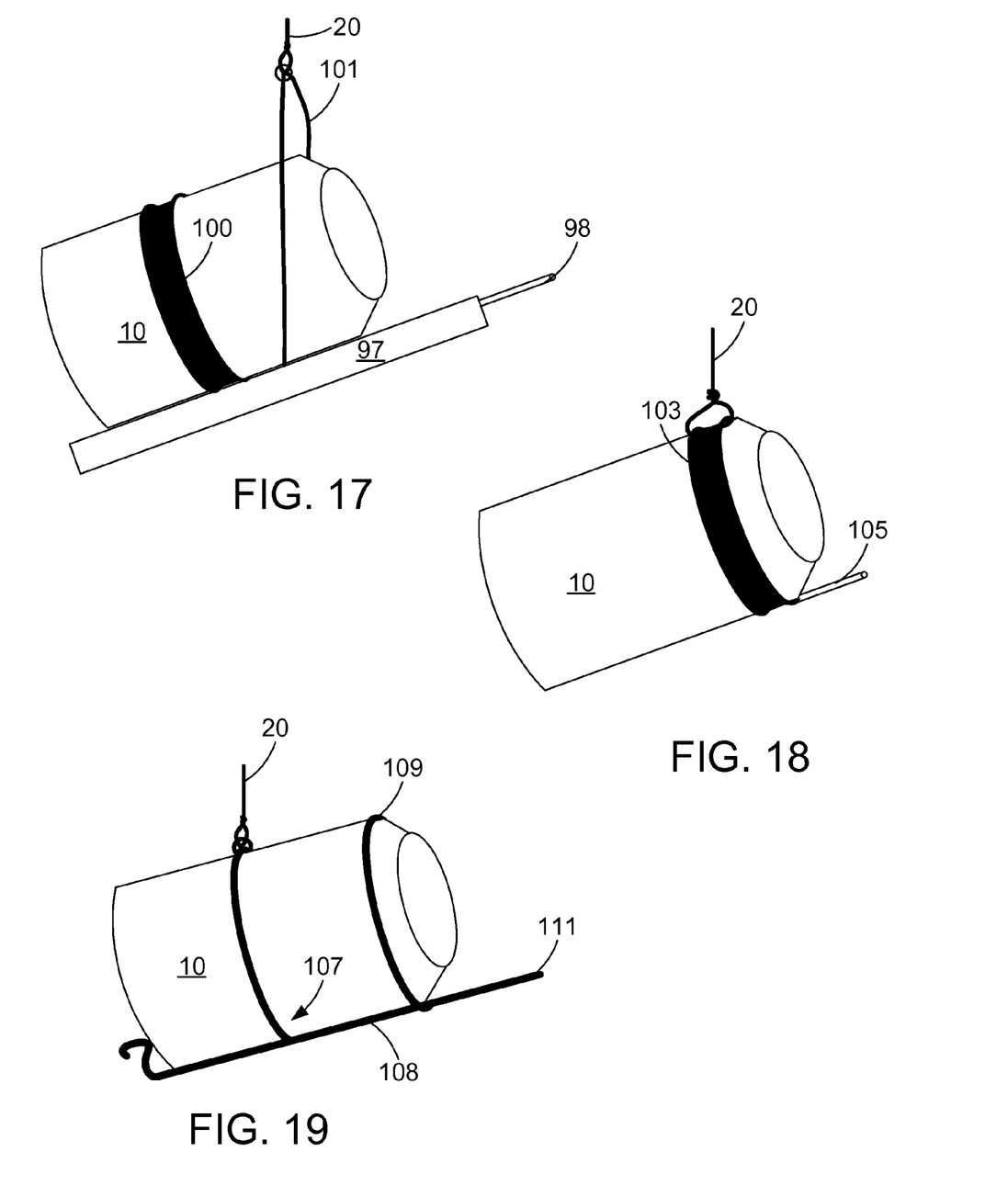
FIG. 17 shows an alternative configuration for the jelly/jam feeder showing use of a hook-and-loop strap to secure the jar.
FIG. 18 shows an alternative configuration for the jelly/jam feeder showing the use of a hook-and-loop strap to secure the jar and perch.
FIG. 19 shows an alternative configuration for the jelly/jam feeder showing a one-piece cradle and perch.

In FIG. 17, the jar 10 is mounted on a board 97 using a strap 100 that includes a hook-and-loop fastener. The board 97 includes a forward perch 98 and the jar 10 lies atop the board 97, and is held thereon with the hook and loop strap 100, which is preferably attached to the board 97. A one-piece support wire 101 may be attached at opposite ends to the sides of the board, straddling the jar, and hung at the upper center portion with a conventional wire hanger 20.

In FIG. 18, a hook and loop strap 100 is preferably attached snuggly around the body of the jar 10. The hook and loop strap 100 may also secure the perch 105 and be connected to a conventional wire hanger 20.

In FIG. 19, a cradle 107 is made of a solid metal or plastic rod 108, the forward end of which includes an integral loop 109 through which the mouth of the jar 10 protrudes and the rear end of which snaps into the recess in the jar bottom. The forward end 111 of the rod 108 functions as a perch. Any suitable loop type hangers, such as those previously described, encircles the rod and jar.

Figure 20:
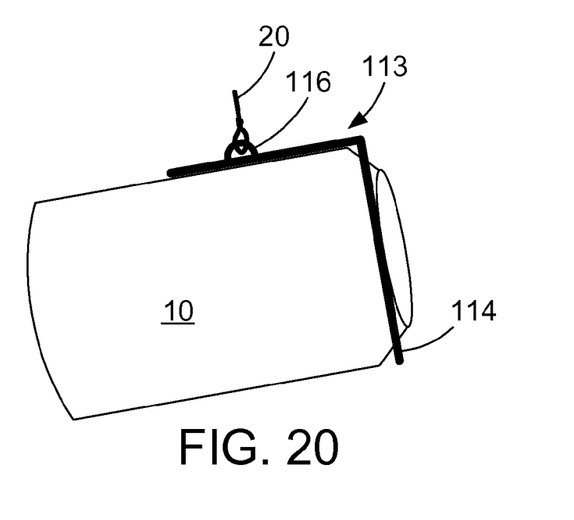
FIG. 20 shows an alternative configuration for the jelly/jam feeder showing an L-shaped cradle.
Figure 21:
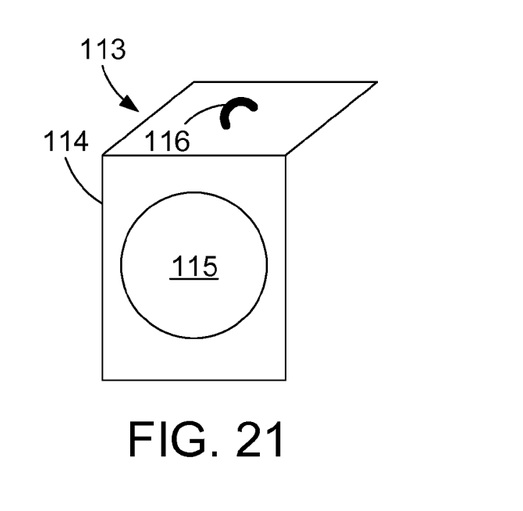
FIG. 21 is a perspective view of the L-shaped cradle shown in FIG. 20.

In FIGS. 20 and 21, the cradle 113 is made of a strap 114 bent or formed in the shape of an L. One end of the strap is provided with a hole 115 for receipt of the neck of the jar 10 and the other end of the strap extends over the body of the jar where a suitable hanger 20 is attached. A connector loop 116 provides a way to attach a conventional wire hanger 20. In the preferred configuration shown in FIGS. 20 and 21, the hole in strap 114 is preferably sized to engage the threads or lugs on the jar 10 to provide a secure attachment between jar 10 and cradle 113.

Figure 22:
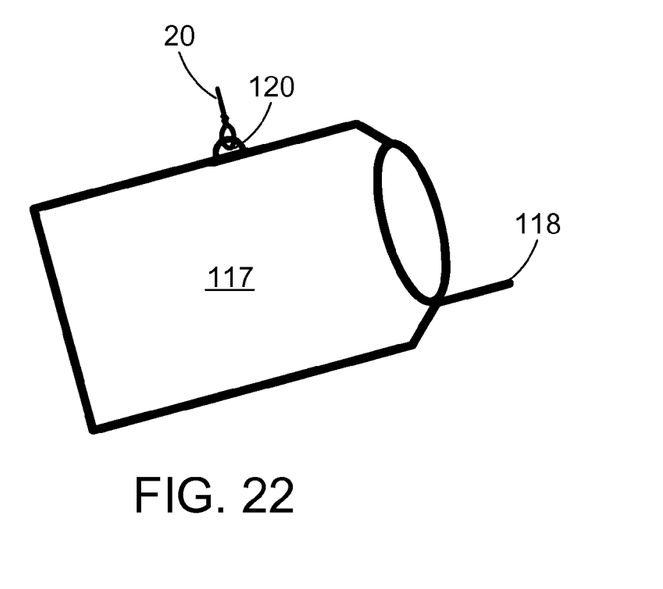
FIG. 22 shows an alternative configuration for the jelly/jam feeder that is a unitary piece of molded plastic with integral perch and mounting eye.

Another configuration is shown in FIG. 22 that uses a blow-molded plastic container 117 which is filled with a suitable jam or jelly. The container may include an integral perch 118 and a mounting eye 120. The perch may also be a separate piece inserted into a suitable socket on the container.

Figure 23:
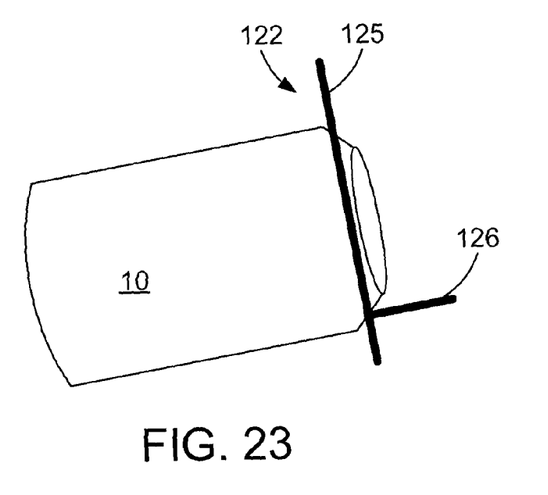
FIG. 23 shows an alternative configuration for the jelly/jam feeder showing a one-piece cradle and perch.
Figure 24:
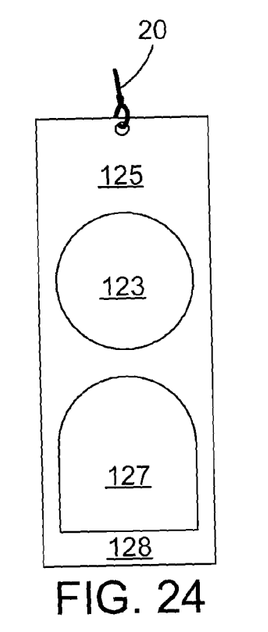
FIG. 24 is an end view of one alternative configuration for a one-piece cradle and perch shown in FIG. 23.

In FIGS. 23 and 24, the cradle 122 comprises a strip 125 of flat metal or plastic stock that is provided centrally with an opening 123 for receipt of the neck of jar 10. A perch 126 may be attached to the strip, as shown in FIG. 23. In the alternative, a cut-out 127 may be provided that creates a perch 128 as shown in FIG. 24. The upper end of the strip 125 has a mounting hole for a wire hanger 20.

Figure 25:
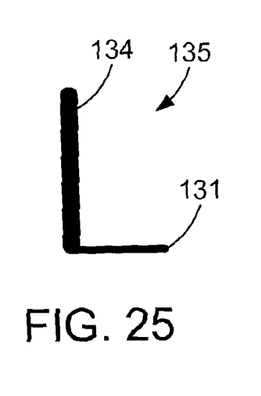
FIG. 25 is a side view of a perch that screws onto a jar as shown in FIG. 26.
Figure 26:
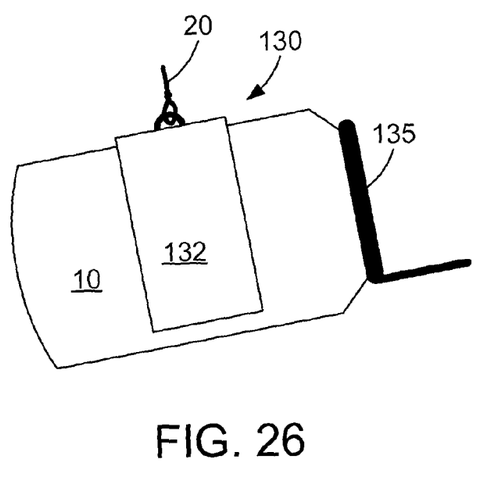
FIG. 26 shows an alternative configuration for the jelly/jam feeder with a separate cradle and perch.

FIGS. 25 and 26 show a combination snap-on cradle 130 and perch 135. The two may be used separately or in combination. Cradle 130 is a snap-on clip 132 similar to the snap-on clip shown in FIG. 12. The perch 135 includes an integral mounting ring 134 that may snap onto or screw onto the mouth of the jar 10, and an extending member 131.

While the configurations for the bird feeder shown in FIGS. 6-15 and 17-26 do not show the user of an attracting flower, one of ordinary skill in the art will appreciate that an attracting flower similar to flower 12 in FIGS. 1-5 and flower 92 in FIG. 16 may be used in combination with any or all of these configurations that do not show attracting flowers in the figures.

A bird feeder allows easily attaching an existing jar of jam or jelly, then hanging the bird feeder to allow birds to eat the jam or jelly in the jar. The result is a bird feeder that provides jam or jelly to birds in a very simple way with little mess and hassle.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims. For example, any suitable shape and configuration of perch and any suitable number of perches could be used. Likewise, any suitable size, shape, number and configuration of attracting flower could be used.

What is claimed is:

1. A bird feeder comprising:
    a flower portion for attracting birds, wherein the flower portion comprises a plurality of petals extending outwardly from a circular opening;
    a perch in proximity to the flower portion; and
    a cradle coupled to the flower portion, the cradle including a circular receptacle aligned with the circular opening of the flower portion, the circular receptacle including at least one internal retaining member that engages an opening of a jar to securely fasten the cradle to the jar, wherein the cradle comprises two sockets and the perch comprises a U-shaped member having a semicircular end and two free ends that have a connection mechanism for engaging and retaining the two free ends in the two sockets.

2. The bird feeder of claim 1 wherein the cradle further comprises at least one connector loop for hanging the bird feeder.

3. The bird feeder of claim 1 wherein the at least one internal retaining member comprises a plurality of protrusions that engage an external protrusion on the opening of the jar.

4. A bird feeder comprising:
    a flower portion for attracting birds, wherein the flower portion comprises a plurality of petals extending outwardly from a circular opening;
    a perch in proximity to the flower portion; and a cradle coupled to the flower portion, the cradle including a circular receptacle aligned with the circular opening of the flower portion, the circular receptacle including at least one internal retaining member that engages an opening of a jar to securely fasten the cradle to the jar, wherein the cradle comprises a plurality of sockets and the perch comprises a substantially straight member that has a connection mechanism for engaging and retaining the free end in one of the plurality of sockets.

5. The bird feeder of claim 4 wherein the cradle further comprises at least one connector loop for hanging the bird feeder.

6. The bird feeder of claim 4 wherein the at least one internal retaining member comprises a plurality of protrusions that engage an external protrusion on the opening of the jar.

7. A bird feeder comprising:
a flower portion for attracting birds, wherein the flower portion comprises a plurality of petals extending outwardly from a circular opening;
a perch in proximity to the flower portion; and
a cradle coupled to the flower portion, the cradle including a circular receptacle aligned with the circular opening of the flower portion, the circular receptacle including at least one internal retaining member that engages an opening of a jar to securely fasten the cradle to the jar, wherein the cradle further comprises a substantially circular band coupled to the circular receptacle via a plurality of axially-extending members, the circular band including at least one deformable portion that allows the circular band to stretch to a diameter greater than a normal diameter of the circular band when not stretched.

8. The bird feeder of claim 7 wherein the cradle further comprises at least one connector loop for hanging the bird feeder.

9. The bird feeder of claim 7 wherein the at least one internal retaining member comprises a plurality of protrusions that engage an external protrusion on the opening of the jar.

10. A bird feeder comprising:
a jar having an opening with external protrusions for receiving a lid;
a flower portion for attracting birds, the flower portion comprising a plurality of petals extending outwardly from a circular opening;
a cradle removably coupled to the circular opening of the flower portion, the cradle including:
a circular receptacle that engages the flower portion and includes a plurality of internal retaining members that engage the external protrusions of the jar to securely fasten the cradle to the jar;
a substantially circular band coupled to the circular receptacle via a plurality of axially-extending members, the circular band including at least one deformable portion that allows the circular band to stretch to a diameter greater than a normal diameter of the circular band when not stretched;
two sockets; and
at least one connector loop for hanging the bird feeder;
a perch in a U shape having a semicircular end and two free ends that have a connection mechanism for engaging and retaining the two free ends in the two sockets, the perch extending from the sockets and straddling one of the plurality of petals of the flower to provide a perch for a bird in front of the flower positioned so a bird may feed from the circular opening in the flower while on the perch.

11. The bird feeder of claim 10 wherein one connector loop is positioned on the cradle so the bird feeder hangs at an angle of approximately thirty degrees when the jar is full.

* * * * *